F. J. COLE.
PISTON ROD EXTENSION GUIDE.
APPLICATION FILED JUNE 2, 1911.
1,003,235.
Patented Sept. 12, 1911.
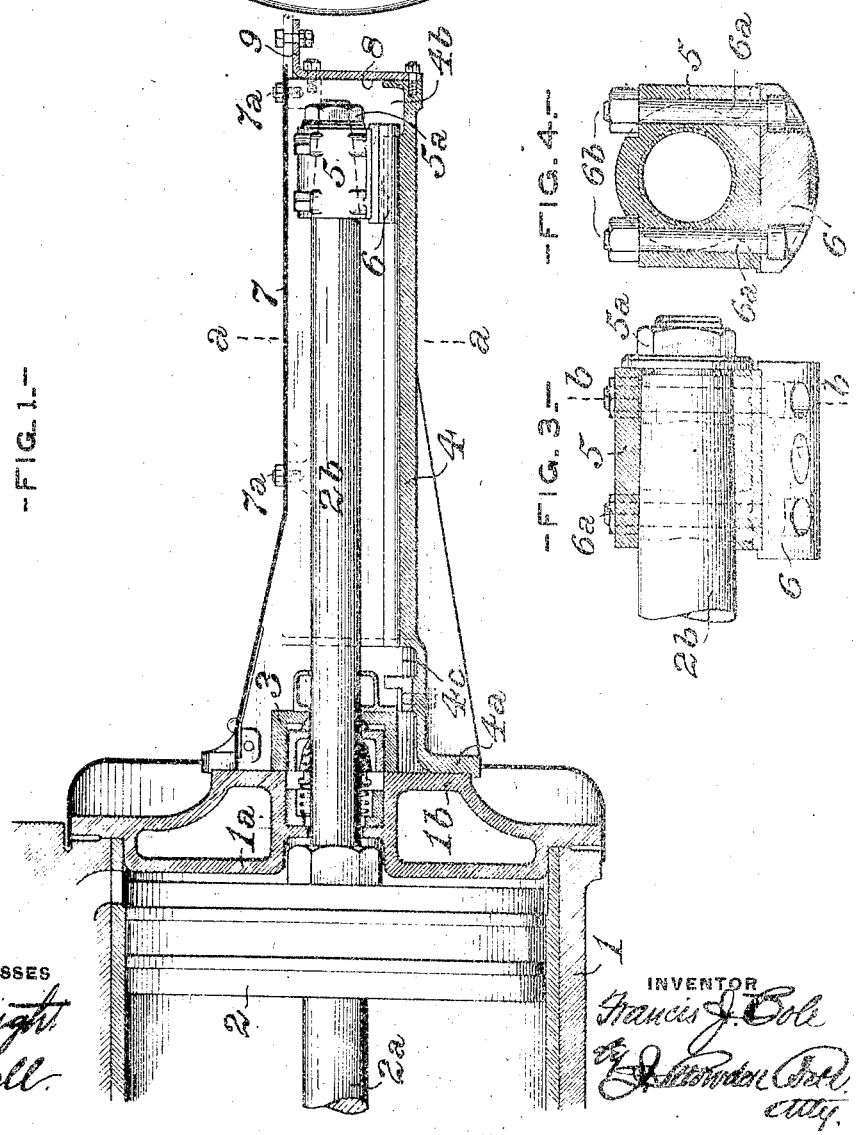

UNITED STATES PATENT OFFICE.

FRANCIS J. COLE, OF SCHENECTADY, NEW YORK.

PISTON-ROD EXTENSION-GUIDE.

1,003,235.  
Specification of Letters Patent.  
Patented Sept. 12, 1911.

Application filed June 2, 1911. Serial No. 630,877.

*To all whom it may concern:*

Be it known that I, FRANCIS J. COLE, of Schenectady, in the county of Schenectady and State of New York, have invented a certain new and useful Improvement in Piston-Rod Extension-Guides, of which improvement the following is a specification.

My invention relates to guides used in locomotive and other steam engines for preventing the piston head from trailing on the bottom of the cylinder, by the provision of a support for a forward extension of the piston rod, in addition to the rear support afforded by the main cross head.

Various forms of piston rod extension guides are known in practice, in some of which the extension of the piston rod is unprovided with packing where it passes through the cylinder head and works in a closed end pipe which is in open communication with the cylinder. In all prior constructions, so far as my knowledge and information extend, the objections obtain that the bottom of the rod becomes flattened, so that in time it ceases to be circular, making it difficult to provide steam tight packing, and it is also impossible to obtain sufficient bearing surface, owing to the limited diameter of the extension rod. Frequent adjustments of the bearing are therefore necessitated, which are apt to be overlooked in the ordinary round house locomotive inspection, and the prime object of the extension of the rod is defeated, as the piston is then allowed to trail on the bottom of the cylinder.

The object of my invention is to provide means whereby the above recited objections may be obviated, by the employment of a carrying shoe and self centering guide by which alinement is insured, and facilities for taking up wear and maintaining the piston rod in normal central position in the cylinder.

The improvement claimed is hereinafter fully set forth.

In the acompanying drawing: Figure 1 is a longitudinal central section through the forward portion of a steam engine cylinder, its head, and the piston rod guide, illustrating an application of my invention; Fig. 2 a transverse section through the piston rod and guide, on the line $a$ $a$ of Fig. 1; Fig. 3, a longitudinal central section, on an enlarged scale, through the shoe, with the bearing in elevation; and, Fig. 4, a transverse section through the shoe and bearing, on the line $b$ $b$ of Fig. 3.

My invention is herein exemplified as applied in connection with a steam engine cylinder, 1, which is closed at its front end by a head, $1^a$, and is fitted with a piston, 2, secured upon a piston rod, $2^a$, having a forward extension, $2^b$, of smaller diameter, which passes through the cylinder head, $1^a$, a steam tight joint of the extension therewith being formed by a properly packed stuffing box, 3, of any suitable and preferred construction. The head, $1^a$, is turned to fit truly in the forward end of the cylinder, and is provided with a central bearing, $1^b$, on its front side, which is turned concentrically with the portion of the head which fits in the cylinder, and is faced off parallel with the grinding face of the front end of the cylinder. The rear end of the piston rod is secured to a cross head (not shown), in the usual manner.

A guide, 4, which is open at its top, and is of substantially U or trough section, is provided with a circumferential flange, $4^a$, at its rear end, which flange is bored and faced to fit truly on the periphery of, and against, the bearing, $1^b$, of the front cylinder head, $1^a$. As shown in Figs. 1 and 2, the flange, $4^a$, does not extend completely around the cylinder head bearing, $1^b$, being open at, and downwardly from, its top, for a width greater than the diameter of the piston rod extension, so as to permit of the removal of the guide without interference by the extension. The guide, 4, is secured to the head by bolts, $4^d$, passing through the flange, $4^a$, and is bored out to segmental form, concentric with the cylinder, for the major portion of its length, that is, to a plane adjoining the stuffing box, 3. The guide is bored and its flange, $4^a$, turned and faced, at one setting, and it will therefore be seen that, when secured to the bearing of the cylinder head, it will be self centering and true axially with the cylinder. A lip is formed on the outer end of the guide, which is recessed below its bore for a short distance from the lip, to provide an oil pocket, $4^b$, in which to maintain a level of oil slightly above the bottom of the bore of the guide. A similar oil pocket, $4^c$, is formed at the rear end of the guide, the lip of said pocket being made detachable, to permit unscrewing of the stuffing box gland, renewal of rings, etc.

The outer end portion of the extension, $2^b$, of the piston rod, is tapered, and a shoe, 5, is secured on the tapered portion by a nut, $5^a$. A bearing block, 6, which is finished, on its lower face, to a curvature corresponding with the segmental bore of the guide, is secured detachably to the bottom of the shoe, 5, by bolts, $6^a$, and nuts, $6^b$. By the insertion of liners of proper thickness between the shoe and bearing face, the extension of the piston rod may be brought back to normal central position when deviated therefrom by wear of the parts.

In order to prevent the access of dust to the bearing surfaces of the guide and shoe, the guide is closed at top by a cap plate, 7, which is secured detachably to it by bolts, $7^a$, and which may be provided with a hinged rear section. To complete the inclosure of the bearing surfaces, the forward end of the guide is closed by a plate, 8, which, in the instance illustrated, abuts against the rear side of a wrought metal bumper beam, 9.

By reason of the bearing surface of the guide being curved concentrically with the common axis of the piston rod and cylinder, slight variations of the position of the shoe in either direction are permissible, without in any wise interfering with the correct and accurate alinement of the piston rod, and therefore no great degree of refinement in the transverse setting of the guide is essential. The facility of adjustment to compensate wear, by the insertion of liners between the shoe and its detachable bearing face is an advantage which will be recognized as being of substantial practical value.

I claim as my invention and desire to secure by Letters Patent:

1. In a steam engine, the combination of a cylinder, a head closing the front end thereof, a piston fitting said cylinder, a piston rod secured to said piston and having a forward extension passing through the head, a self centering guide secured to the head and having a segmental bearing face concentric with the cylinder, and a shoe fixed to the extension of the piston rod and having a segmental bearing face fitting the bearing face of the guide.

2. In a steam engine, the combination of a cylinder, a head closing the front end thereof, and having a cylindrical bearing on its outer side concentric with the bore of the cylinder, a self centering guide secured to the head, around said bearing, and having a segmental bearing face concentric therewith, a piston fitting the cylinder, a piston rod secured to said piston and having a forward extension passing through the head, and a shoe fixed to the extension and having a segmental bearing face fitting the bearing face of the guide.

3. In a steam engine, the combination of a cylinder, a head closing the front end thereof, and having a cylindrical bearing on its outer side concentric with the bore of the cylinder, an open topped self centering guide having a segmental bearing face concentric with the bore of the cylinder, a circumferential flange on said guide fitting the periphery of, and secured to, the cylinder head bearing, said flange having an upper opening to clear a piston rod extension, a piston fitting the cylinder, a piston rod secured to said piston and having a forward extension passing through the head, and a shoe fixed to the extension and having a segmental bearing face fitting the bearing face of the guide.

4. In a steam engine, the combination of a cylinder, a head closing the front end thereof, a piston fitting said cylinder, a piston rod secured to said piston and having a forward extension passing through the head, a self centering guide secured to the head and having a segmental bearing face concentric with the cylinder, a shoe fixed to the extension of the piston rod, and a bearing block secured detachably to the shoe and having a segmental lower face fitting the bearing face of the guide.

5. In a steam engine, the combination of a cylinder, a head closing the front end thereof, a piston fitting said cylinder, a piston rod secured to said piston and having a forward extension passing through the head, an open topped self centering guide secured to the head and having a segmental bearing face concentric with the cylinder, a shoe fixed to the extension of the piston rod and having a segmental bearing face fitting the bearing face of the guide, and cover plates secured detachably to the guide and closing the bearing face thereof against access of dust and other foreign matter.

FRANCIS J. COLE.

Witnesses:
 FRANK F. SCOVILLE,
 S. W. TYLER.